US006251040B1

(12) United States Patent
Safont et al.

(10) Patent No.: US 6,251,040 B1
(45) Date of Patent: Jun. 26, 2001

(54) GEAR ARRANGEMENT

(75) Inventors: Vicenc Safont, Montgat; Josep-Maria Masip, Sant Cugat del Vallés; Josep Agell, Esplugues de Llobregat; Antonio Rebordosa, Sant Fruitós de Bages; Mariano Peñaranda, Barcelona, all of (ES)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/511,605

(22) Filed: Feb. 23, 2000

Related U.S. Application Data

(63) Continuation of application No. PCT/EP98/07053, filed on Nov. 5, 1998.

(30) Foreign Application Priority Data

Dec. 19, 1997 (DE) .............................. 197 56 923

(51) Int. Cl.[7] .................................................. F16H 3/62
(52) U.S. Cl. .................................................. 475/299
(58) Field of Search ................... 475/298, 299, 475/338, 342

(56) References Cited

U.S. PATENT DOCUMENTS 3,109,949  11/1963  Hartwig et al. .
3,872,742 * 3/1975  States ............................. 475/299
4,791,833 * 12/1988  Sakai et al. ..................... 475/299
5,692,575 * 12/1997  Hellström ....................... 475/299

FOREIGN PATENT DOCUMENTS 30 45 088   7/1982  (DE) .
33 07 023   8/1984  (DE) .
0 022 465   5/1980  (EP) .

* cited by examiner

Primary Examiner—Sherry Estremsky
(74) Attorney, Agent, or Firm—Fish & Richardson P.C.

(57) ABSTRACT

The invention is directed to a gear arrangement for domestic use, particularly for kitchen appliances. It has an input shaft (6) at the driving end and an output shaft (20) rotatably connected to a working part at the driven end, there being arranged between the input shaft (6) and the output shaft (20) a planet gear train comprising at least one planet gear (10), a sun gear (9) meshing with said planet gear and a ring gear (15) meshing with said planet gear (10). The planet gear (10) is in meshing engagement with the input shaft (6) on the one side and in rotary engagement by way of its axle bearing (12) with the output shaft (20) on the other side. The planet gear (10) and the ring gear (15) have each two toothed rings (11, 14; 16, 17) of various diameter, and the ring gear (15) is displaceable in an axial direction (4) so that in the one operating position the toothed rings (11, 17) of larger diameter are in meshing engagement, while in the other operating position the toothed rings (14, 16) of smaller diameter are in meshing engagement. (FIG. 2)

15 Claims, 2 Drawing Sheets

GEAR ARRANGEMENT

This is a continuation of PCT application Ser. No. PCT/EP 98/07053, filed Nov. 5, 1998, which claims priority from German application Ser. No. 197 56 923.4, filed Dec. 19, 1997, (pending).

BACKGROUND OF THE INVENTION

This invention relates to a gear arrangement for domestic use, particularly for kitchen appliances, having an input shaft at the driving end and an output shaft rotatably connected to a working part at the driven end, there being arranged between the input shaft and the output shaft a planet gear train comprising at least one planet gear, a sun gear meshing with said planet gear and a ring gear meshing with said planet gear, said planet gear being in meshing engagement with the input shaft on the one side and in rotary engagement by way of its axle bearing with the output shaft on the other side.

Planet gear trains, also referred to as epicyclic gear trains, are generally known and described in "Meyers Grosses Taschenlexikon", Volume 17, 1983, Bibliographisches Institut, Mannheim/Zürich or in "Meyers Lexikon der Technik und der exakten Naturwissenschaften", 3rd Volume, Bibliographisches Institut, Mannheim/Zürich, for example.

Planet gear trains are characterized in that at least one gear, called the planet gear, rotates not only about its own axis but also revolves with this axis around another gear, called the sun gear, and that, in addition, the planet gear meshes with this sun gear and an outer ring gear. If two of these three components, i.e., the planet gear, the sun gear and the ring gear, are held stationary, the third component executes a compulsory movement. Conventionally, use is made of three planet gears revolving around the sun gear and held in a common planet carrier. With the size of the individual gears suitably selected, it is possible to obtain commensurate speed increasing or speed reducing ratios between the input shaft and the output shaft, for example, between the shaft of the sun gear and the shaft of the planet carrier.

A planet gear train has already been used in a processing tool for preparing food, as disclosed in EP-B1 0 292 664. The processing tool known from EP-B1 0 292 664 is of the type used for mixing and kneading food ingredients. The processing tool comprises a working shaft adapted to be driven by an electric motor of a kitchen machine. The actual housing of the processing tool is shaped to serve simultaneously as the mixing and kneading tool. In the area of its upper end the housing is driven by way of a planet gear train, at its lower end it is in sliding contact with a bearing block. The upper end of the processing tool is rotatably held in a receiving container of the kitchen machine. In driving mode the housing, which serves simultaneously as the processing tool, is rotated by way of the planet gear train to perform a mixing and kneading movement.

SUMMARY OF THE INVENTION

It is an object of the present invention to provide a gear arrangement for domestic use, particularly for kitchen appliances, such that its speed increasing or speed reducing ratios can easily be changed in at least two stages in order to enable the drive conditions of an appliance fitted with the gear arrangement to be adapted to the desired working conditions, whereby it should be a simple matter to change between the two different drive conditions.

Proceeding from a gear arrangement with the features initially referred to, this object is accomplished in accordance with the present invention by the planet gear and the ring gear having several gear pairs of various diameter and by the ring gear being displaceable in an axial direction so that in the one operating position the gear pairs of larger diameter are in meshing engagement, while in the other operating position the gear pairs of smaller diameter are in meshing engagement. With the at least one planet gear and the ring gear each having at least two toothed rings of various diameter and with the ring gear being displaceable in an axial direction, thus enabling the toothed rings of larger diameter to be brought into meshing engagement in one operating position while enabling the toothed rings of the other, smaller diameter to be brought into meshing engagement in the other or a further position, it is possible to set up at least two or more different transmission ratios. The number of gear stages depends on the number of interacting pairs of gear. When a particular gear stage is being set, however, the other gear pairs need not be in mesh. Preferably there are two pairs of gear, meaning two changeable gear stages.

Thanks to the displaceable arrangement of the ring gear, which forms the outer body of the gear arrangement, the displacement needed to change the drive conditions can easily be made from the outside of a housing, thus resulting in a sturdy and operationally reliable arrangement. By contrast the gears, meaning the planet gear or planet gears and the sun gear, can be arranged in a fixed configuration relative to each other.

In a preferred embodiment of the gear arrangement, in operation the axially displaceable ring gear is non-rotatably associated with the housing of the appliance, i.e., it is fastened in the housing such that it is displaceable only axially between the two different mesh positions. If the sun gear, which can be mounted directly on an input shaft, is driven in this arrangement, the planet gear between the sun gear and the ring gear will revolve as the result of being accordingly meshed with them and will drive, by way of its axle bearing, an output shaft which is connected to said bearing and can be constructed as a hollow shaft.

For a uniform transmission of force between the sun gear and the ring gear it is preferable to provide three planet gears in accordance with one aspect of the invention. Such planet gears are arranged uniformly in the space between the sun gear and the ring gear, i.e., with the axles of their axle bearings set at an angle of 120 degrees relative to each other.

According to another aspect of the invention, the input shaft is passed through the gear arrangement such that it can be connected with a processing tool at the opposite end in order, with two pairs of gears, to provide a further drive with a different speed yet same speed of input shaft in addition to the two different speed increasing or speed reducing ratios produced by the respective two toothed rings of the planet gear or planet gears and the ring gear.

To enable coupling with the first output shaft as well as with the second output shaft by simple coupling means it has proven to be preferable for the first output shaft to be constructed in sleeve shape involving the form of an externally or internally toothed sleeve which concentrically encompasses the second output shaft formed by the extended section of the input shaft. In this arrangement the second output shaft is preferably equipped with axially extending teeth so that a suitable working element can be plugged on these teeth, whereas the first output shaft has an elongated toothing on its radially outer side in order to plug on a driving element without interacting with the toothing of the second output shaft.

To ensure an exact displacement of the ring gear it is desirable to use a displacement device having a cam that engages in a corresponding cam track of a housing. Movement of the displacement device in axial direction causes the cam to move along the cam track, such that the ring gear is thereby displaceable axially in the direction of its center axis in the two operating positions in order to mesh with the larger or smaller toothed rings of the planet gear and the ring gear.

Simple guidance of the ring gear for its axial displacement is achieved by a tongue and groove arrangement. This arrangement preferably extends parallel to the axial direction of the planet gears.

For the ring gear displacement to be performed with good handling convenience, the displacement device includes a manipulating element comprising the cam or the cam track and being rotatably guided relative to the ring gear. In a further aspect of this arrangement it is desirable for the manipulating element to incorporate the at least one cam. Said cam can then be guided in a corresponding groove constructed as the cam guiding track of a housing and/or in a corresponding groove and cam track of the ring gear using a turning motion of the manipulating element, so that the cam moves in the axial direction of the gears and takes the ring gear along with it in axial direction in order to displace it between its different drive positions.

To ensure that the set position of the ring gear, and with it the selected drive speed increasing or reducing ratio, is retained during use of a processing tool, it should be possible to lock the manipulating element in the respective engagement positions of the ring gear by having the cam latch in a recess in the respective limit positions, for example.

Further details and features of the present invention will become apparent from the subsequent description of an embodiment illustrated in the accompanying drawing.

DETAILED DESCRIPTION

Figure 2:
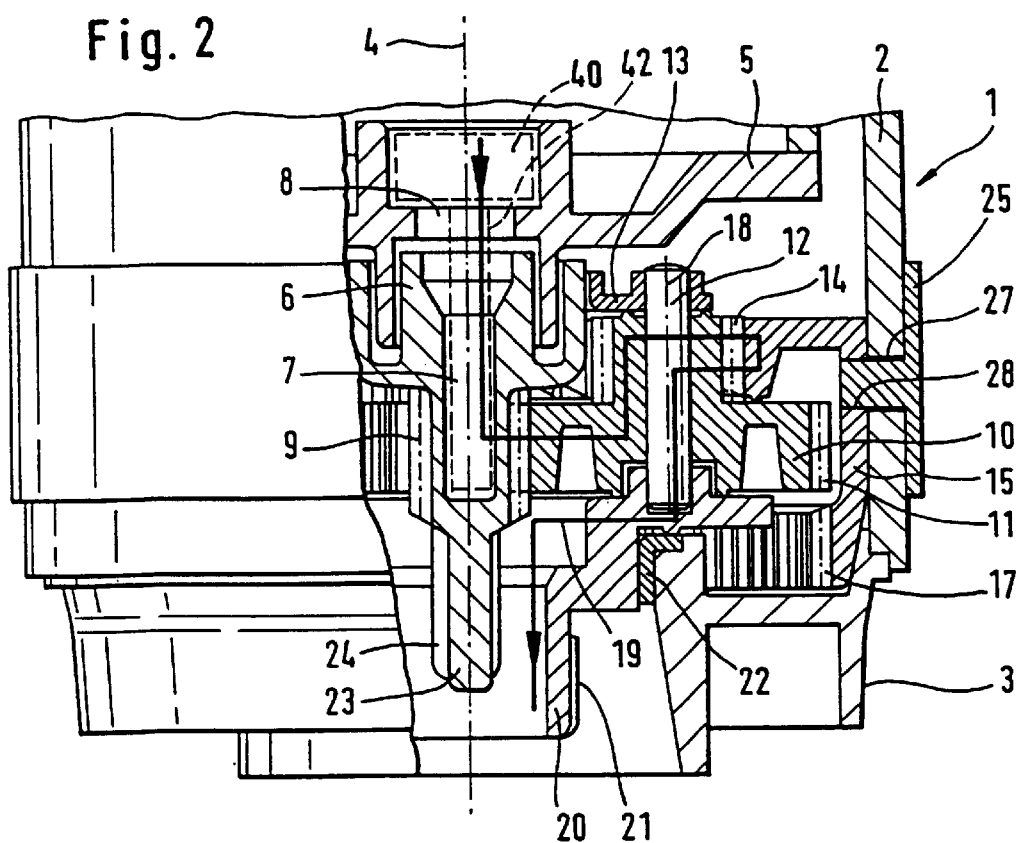
FIG. 2 is a partial sectional view of a gear arrangement taken along the center axis, showing the gears in a first position.
Figure 3:
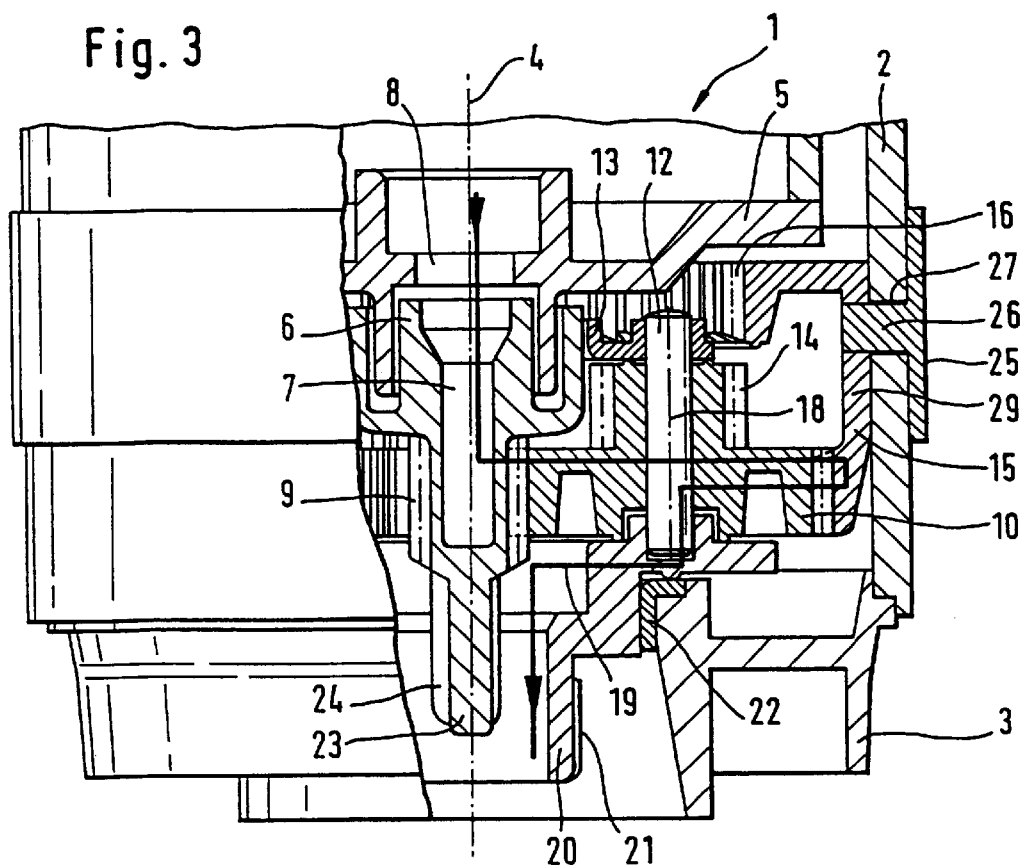
FIG. 3 is a view similar to the one of FIG. 2, showing a second position.

As FIGS. 2 and 3 show, the gear arrangement comprises a housing 1 with an upper housing part 2 and a lower housing part 3 which are arranged coaxially to a center axis 4. A middle housing part 5 closing the upper housing part 2 is inserted on the upper side in the interior of the upper, sleeve-shaped housing part 2. The middle housing part 5 takes support on a central driving element 6 arranged centrally along the center axis 4.

The central driving element 6 has a blind-end bore 7 accessible through a central opening 8 in the middle housing part 5. An input shaft of a motor unit 42 can be inserted and coupled in said blind-end bore 7 in order to rotate the central driving element 6.

The central driving element 6 forms the input shaft of the gear unit and is equipped in its middle with a sun gear 9. Three planet gears 10 have their respective lower, large toothed ring 11 in meshing engagement with said sun gear 9. The three planet gears 10 are spaced uniformly around the circumference of the sun gear 9, being spaced 120 degrees apart. The three planet gears 10 each have an axle shaft 12 carried in a common axle mounting plate 13. Said axle mounting plate 13 has a central opening resting with its edge in centrally locating manner against the central driving element 6.

Each planet gear 10 has one large toothed ring 11 which, as previously explained, meshes with the sun gear 9, and one upper small, toothed ring 14.

The planet gears 10 are enclosed radially on the outside by a ring gear 15 which in turn comprises an upper toothed ring 16 of small diameter and a lower toothed ring 17 of large diameter, said upper toothed ring 16 of small diameter being associated with the upper, small, toothed rings 14 of the planet gears 10, while the lower toothed ring 17 of large diameter is associated with the lower, large, toothed rings 11 of the planet gears 10.

The ring gear 15 is displaceable in the direction of the axis 4 and the axis of rotation 18 of the planet gears 10 between a lower position, as shown in FIG. 2, and an upper position, as shown in FIG. 3. In the lower position the upper toothed ring 16 of small diameter of the ring gear 15 is in meshing engagement with the small, toothed ring 14 of the planet gears, producing a flow of force or a driving connection as represented by the continuous line 19 of FIG. 2.

When it is desired to change the reduction ratio obtained with the gear setting as shown in FIG. 2, the ring gear 15 is displaced upwardly in the direction of the axis 4, causing the upper toothed ring 16 of the ring gear 15 to be out of meshing engagement with the upper, small, toothed ring 14, while the lower toothed ring 17 of the ring gear 15 now meshes with the lower, large, toothed ring 11 of the planet gears 10. The result is a changed flow of force or driving connection as shown again by the continuous line 19 of FIG. 3.

In the respective positions of the ring gear 15 in accordance with FIGS. 2 and 3, the rotary movement is picked off at the output end by a toothed sleeve 20 with an external toothing 21, enabling an appropriate processing tool, not shown, to be coupled to said outer toothing 21 of the toothed sleeve 20. As becomes apparent from FIGS. 2 and 3, the toothed sleeve 20 is compelled to rotate by the axle shafts 12, on which the planet gears 10 revolving between the sun gear 9 and the ring gear 15 are mounted, rotating about the axis 4. For this purpose the toothed sleeve 20 is supported in its upper area by sliding elements 22 associated with the lower housing part 3.

When it is desired to drive a processing tool at a high rotational frequency, the rotational frequency of the central driving element 6, to which is coupled an input shaft of a drive motor, can be picked off directly from the bottom of the gear arrangement by way of a second output shaft 23 equipped with an external toothing 24. For this purpose a corresponding connecting element is plugged on the toothing 24 of the second output shaft 23, said connecting element being furthermore adapted to rest against the inside of the toothed sleeve 20.

With the gear arrangement as shown in FIGS. 2 and 3 it is possible therefore to pick off two different rotational frequencies at the output end, namely through the second output shaft 23 and, in addition, through the first output shaft formed by the toothed sleeve 20, in the different respective positions of the ring gear 15.

Figure 1:
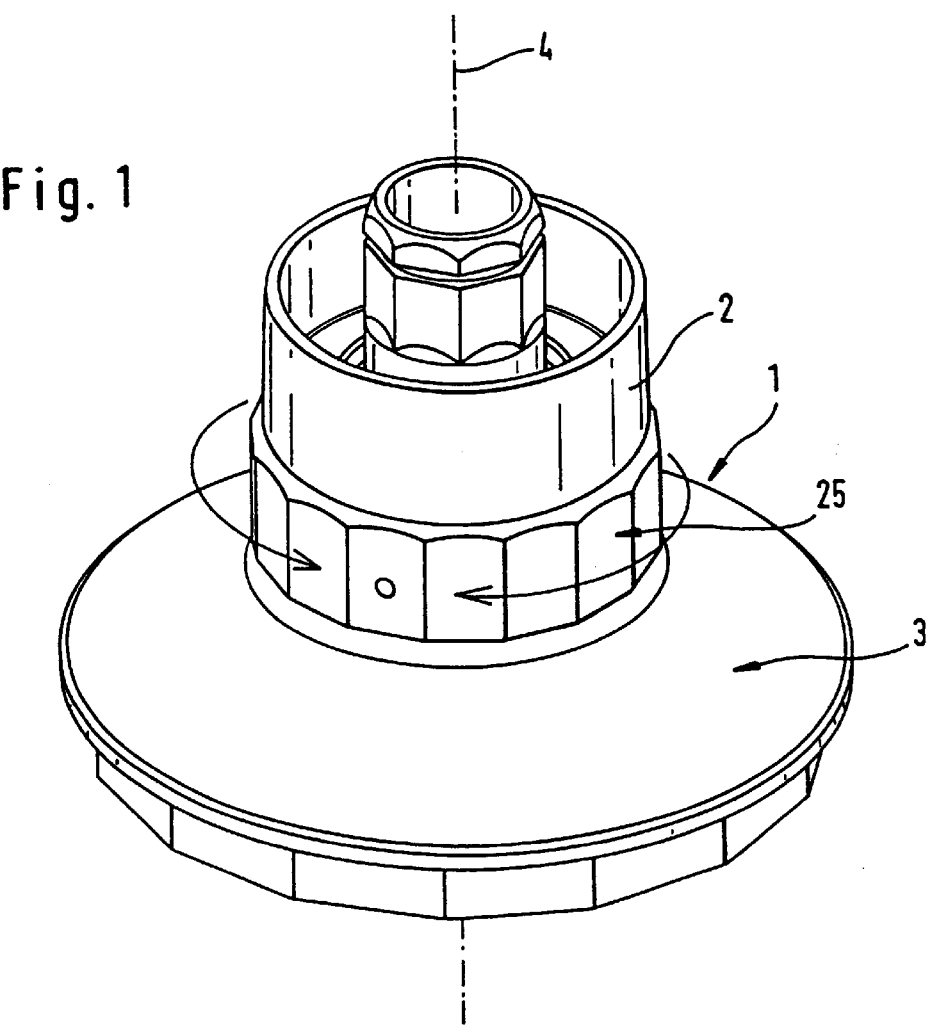
FIG. 1 is a perspective view of a three-stage gear arrangement with a housing, said housing representing a cover for a comminuting or mixing bowl in which a processing tool rotates.

To move the ring gear 15 from its lower position as shown in FIG. 2 and from its upper position as shown in FIG. 3, provision is made for a displacement device having an annular manipulating element 25 as shown in FIG. 1 resting against the outside of the upper housing part 2. This manipulating element 25 has at least one cam 26 that engages within a corresponding groove 27 in the upper housing part 2 and a corresponding opening 28 in the tubular section 29 of the ring gear 15 connecting the upper and the lower toothed ring 16, 17 in a spaced relationship to each other. The groove 27 extends in the circumferential direction of the ring gear 15 and the upper housing part 2 with a defined incline such that the cam 26 is displaced within the groove 27 when the manipulating element 25 is turned in circumferential direction, resulting in the cam 26 moving the ring gear 15 in the direction of the axis 4.

A perspective representation of the arrangement of such a manipulating element 25 is shown in FIG. 1 in the form of a cover, the external housing structure of FIG. 1 being identical with the arrangement of FIGS. 2 and 3; in this FIG., the same reference numerals are applied to comparable components as those used in FIGS. 2 and 3. The cover 25 can be fitted onto a container and a processing tool can be driven with it at various speeds by way of the gear arrangement, as is known from the prior German patent application 197 03 871.9. No further details of this will be given here in the interest of simplicity.

Figure 4:
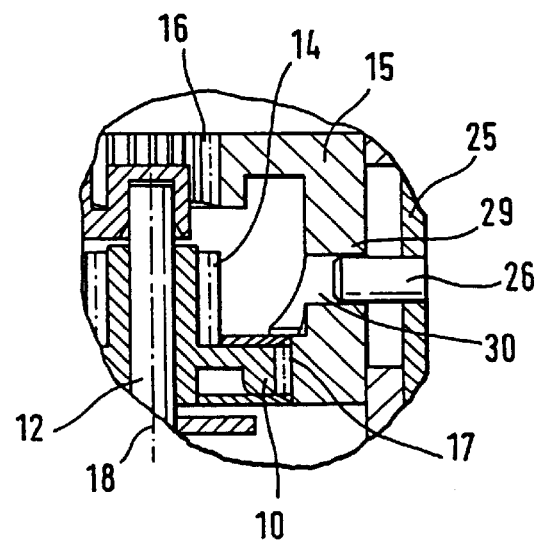
FIG. 4 is a partial sectional view showing by way of example the mode of function of a displacement device for changing the gear arrangement into the first and the second position of a speed reduction ratio.

FIG. 4 shows a modified embodiment of the manipulating element 25 and the related cam and cam track arrangement. Whereas in the embodiment of FIGS. 2 and 3 the cam 26 is guided in the groove 27 of the housing 2 and firmly anchored in the tubular section 29 of the ring gear 15, the detailed view of FIG. 4 shows the cam 26 freely guided in the housing 2 while the cam track is formed by a groove 30 in the ring gear 15.

What is claimed is:

1. A gear arrangement for driving a working part of an appliance, the gear arrangement comprising:
    an input shaft at a driving end of the gear arrangement;
    a first output shaft for rotatable connection to the working part at a driven end of the gear arrangement,
    a planet gear train arranged between the input shaft and the first output shaft, the planet gear train comprising:
        at least one planet gear having an axle bearing, a first gear ring, and a second gear ring of smaller diameter than said first gear ring, a portion of said planet gear in rotary engagement by way of the axle bearing with the first output shaft;
        a sun gear, driven by said input shaft and in meshing engagement with another portion of said planet gear to drive said planet gear,
        a ring gear having a first gear ring and a second gear ring of smaller diameter than said first gear ring, said first gear ring of said ring gear being meshingly engageable with said first gear ring of said at least one planet gear to form a first gear pair, said second gear ring of said ring gear being meshingly engageable with said second gear ring of said at least one planet gear to form a second gear pair, the ring gear being displaceable in an axial direction so that only one of said first and second gear pairs is in meshing engagement at a time.

2. The gear arrangement as claimed in claim 1, wherein said at least one planet gear comprises three planet gears arranged uniformly over a circumference about the sun gear, the three planet gears in meshing engagement with both the ring gear and the sun gear.

3. The gear arrangement as claimed in claim 1, wherein a first end of the first input shaft passes through the planet gear train and said first end has a pick-off serving as a second output shaft.

4. The gear arrangement as claimed in claim 3, wherein the first output shaft is formed by a toothed sleeve which concentrically encompasses the second output shaft.

5. The gear arrangement as claimed in claim 1, wherein the ring gear is axially displaceably guided by a tongue and groove arrangement.

6. The gear arrangement as claimed in claim 5, wherein said tongue and groove arrangement extends parallel to the axial direction of the at least one planet gear.

7. An appliance for driving a working part comprising:
    a housing;
    a gear arrangement attached to the housing; said gear arrangement comprising:
        an input shaft at a driving end of the gear arrangement;
        a first output shaft for rotatable connection to the working part at a driven end of the gear arrangement;
        a planet gear train arranged between the input shaft and the first output shaft, the planet gear train comprising:
            at least one planet gear having an axle bearing, a first gear ring, and a second gear ring of smaller diameter than said first gear ring, a portion of said planet gear in rotary engagement by way of the axle bearing with the first output shaft,
            a sun gear, driven by said input shaft and in meshing engagement with another portion of said planet gear to drive said planet gear, and
            a ring gear having a first gear ring and a second gear ring of smaller diameter than said first gear ring, said first gear ring of said ring gear being meshingly engageable with said first gear ring of said at least one planet gear to form a first gear pair, said second gear ring of said ring gear being meshingly engageable with said second gear ring of said at least one planet gear to form a second gear pair, the ring gear being displaceable in an axial direction so that only one of said first and second gear pairs is in meshing engagement at a time; and
    a motor unit having a motor input shaft coupled for driving rotation of said input shaft.

8. The appliance of claim 7, wherein, in operation the ring gear is non-rotatably fixed relative to the housing of the appliance.

9. The appliance of claim 8, wherein said at least one planet gear comprises three planet gears arranged uniformly over a circumference about the sun gear, each of said three planet gears in meshing engagement with both the ring gear and the sun gear.

10. The appliance of claim 8, wherein a first end of the input shaft passes through the planet gear train and said first end has a pick-off serving as a second output shaft.

11. The appliance of claim 10, wherein the first output shaft is formed by a toothed sleeve which concentrically encompasses the second output shaft.

12. The appliance of claim 11 wherein the appliance further comprises a displacement device and a cam track, the displacement device having at least one cam that engages in the cam track, the ring gear being axially displaceable by the displacement device.

13. The appliance of claim 12 wherein the displacement device includes a manipulating element comprising the at least one cam or the cam track, said manipulating element being rotatably guided relative to the ring gear.

14. The appliance of claim 13 wherein the at least one cam is incorporated in the manipulating element.

15. The appliance of claim 13 wherein the manipulating element is adapted to be locked in a position in which one of the first and second gear pairs are in meshing engagement.

* * * * *